March 29, 1960     F. C. GOODRICH     2,930,612
ROCKING HORSE
Filed June 28, 1957
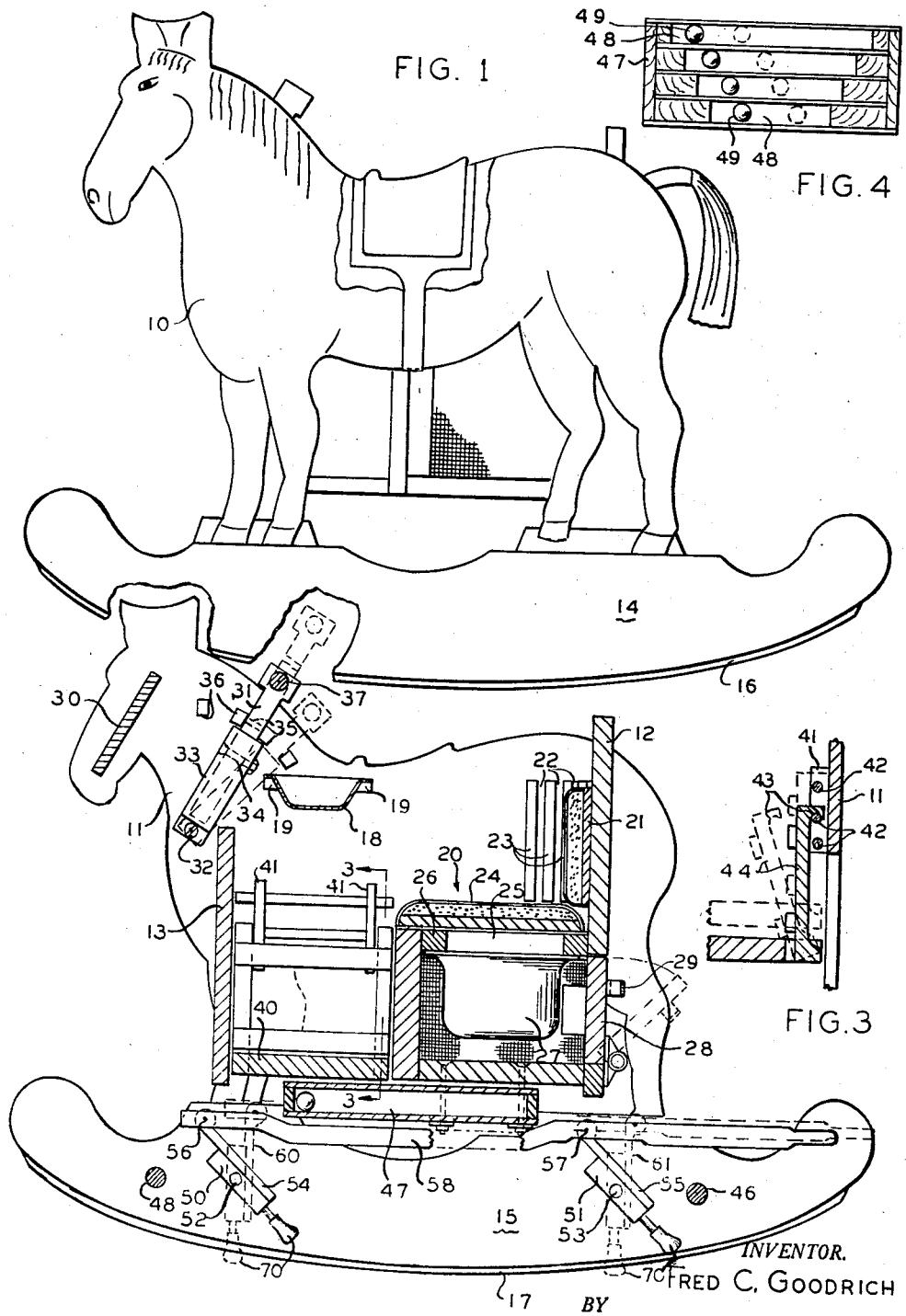
INVENTOR.
FRED C. GOODRICH
BY
*James C. Hamilton*
ATTORNEY

United States Patent Office 2,930,612
Patented Mar. 29, 1960

2,930,612

ROCKING HORSE

Fred C. Goodrich, Santa Rosa, Calif.

Application June 28, 1957, Serial No. 668,799

8 Claims. (Cl. 272—52.5)

My present invention relates to a rocking horse, and more particularly to a rocking horse for small children, which may be adjusted to children of minor ages, and having certain features not usually found in this type of toy.

The principal object of my invention is to produce an improved rocking horse for children.

Another object is to produce an improved rocking horse which may be permitted to rock in the usual manner of a rocking horse or which may be locked in a stationary position.

Another object is to produce an improved rocking horse which has sound effects emulating hoof beats of a horse.

Another object is a rocking horse which is rubber-tired to prevent creeping action on the floor.

Other objects of the rocking horse will be more apparent as the description of the same progresses.

In the illustrations of the rocking horse:

Fig. 1 is a left side elevation, the right side of the rocking horse being a duplicate of the left side.

Fig. 2 is a central vertical cross-section of the central portion of the rocking horse, the cross-section being taken approximately midway between the two outer sides of the rocking horse.

Fig. 3 is a vertical fragmentary cross-section, taken on lines 3—3 of Fig. 2, better showing the means of attaining various heights of the foot rest in front of the seat.

Fig. 4 is a horizontal sectional view through the nose-emitting box member 47 of Fig. 2.

The left side of the chair-like rocking horse is indicated by the numeral 10.

The right side of the chair-like rocking horse is indicated at 11.

A backboard is indicated at 12, and a frontboard is indicated at 13.

Backboard 12, and frontboard 13, space the side members 10 and 11, equal distances apart.

The sides 10 and 11 of the horse are fixed to the heavy rockers 14 and 15 respectively, and the rocker members 14 and 15, being approximately twice as thick as the sides 10 and 11 of the horse.

On the bottom surface of the rockers 14 and 15, are fixed resilient rubber strips 16 and 17.

These rubber strips perform two functions. They not only reduce noise when the rocking horse is in motion on the floor, but also prevent the entire structure from creeping when in motion.

A removable tray 18, rests on brackets 19 fixed to the inner side of the horse members 10 and 11, the tray 18 being instantly removable for cleaning purposes.

The removable seat which is generally indicated at 20, is provided with a removable back 21, which is fitted with splines on the vertical sides, not shown, which may be advanced forward in slots 22, from the vertical uprights 23. Particular attention is directed to the fact that while the walls of slots 22 sustain the back 21, it is actually supported by seat 20 in all of its positions.

This provides a shortening-up of the seat portion for a small child as compared to a longer-legged child.

The seat 20 is also provided with a removable cover 24 to expose an opening 25, in the frame member 26, under which is positioned a urinal 27.

The urinal 27, is admitted through a door 28, hinged in the back member 12.

29 is a handle member for the door 28. 30 is a stiffening panel located between the heads of the horse members 10 and 11.

Across the neck portions of the two sides 10 and 11 of the horse portions are interfitting guide and slide members 33, 31. Each guide member 33 is radially pivoted at 32 to the adjacent side 10 or 11. Each slide and guide 31, 33 is locked in adjusted position by means of a bolt 34.

In addition there are a plurality of block members 36, located on the inner side of the horse portion 10, between which the slide member 31 may be positioned, the block members 36 adding strength to the assembly, a bar 37 connects a duplicate slide member on the near side of the horse, this bar 37 is for the hands of the operator and may be adjusted high or low as just described.

40 indicates a vertically raisable footrest to accommodate small children having shorter legs than older children.

This footrest 40 has two high positions, the one shown in Fig. 2, being the bottom or lowest position, the operation is better illustrated as shown in Fig. 3, in which the side 11 of the horse is fitted with a pair of block members 41, through which are located dowel pins 42. These pins 42 stand away from the side portion 11 a sufficient distance for the hook-like ends 43 of the pivoted lever 44, to engage the tops of said pins 42 when altering height of footrest 40 as indicated in dotted lines of Fig. 3.

Across the forward and rear portions of the rockers 14 and 15 are located spacing dowels 45 and 46 respectively.

Directly above the rockers 14 and 15 is located a box member 47, having a plurality of channels 48, in which are located steel balls 49, these channels 48 are progressively longer in length as shown in Fig. 4, the balls roll in the channel 48 back and forth as the case may be, when the rocking horse is rocked back and forth by the child inside, as the balls are stopped by the channels 48 they produce a sound similar to hoof beats of a horse on a road.

There may be times when the parent of the child does not want this noise in the room but still wants to use the rocking horse as a chair, to lock the rocking horse so it cannot be rocked, I have provided the block members 50 and 51 respectively, between the front and rear portions of rockers 14 and 15 respectively, these locks are shown in the rocking position in Fig. 2, being pivoted on the pivots 52 and 53 respectively.

The blocks 50 and 51 are connected to the blocks 54 and 55, and are pivoted at 56 and 57 respectively to a central draw-bar member 58, passing under the box 47, the dotted lines 60 and 61 indicate the vertical position of the members 54 and 55, when the draw-bar 58 is moved rearwards, at which position rubber knobs engage the floor and slightly raise the rocker treads 16 and 17 above the floor, so that the rocking horse becomes stationary.

As will be appreciated, I have provided a device which is not only adjustable for different sized children but wherein the noise-emitting box 47, as well as the floor-engaging knobs 70 and the operating means 58 are concealed from the seated child and rendered inaccessible to him.

Having thus described my invention what I claim as new is:

1. In a rocking horse type of toy providing a frame comprising laterally spaced and parallel rockers, and upstanding side members fixedly secured thereto, there being a plurality of separate cross members connecting the side members and spaced in the direction of the length of said frame, a child's seat between said side members rearwardly of the forward ends of the latter and supported by certain of said cross members, there further being a transversely extending hand rail forwardly of said seat and supported by said side members; the combination of a foot rest forwardly of said seat and bodily shiftable in a direction substantially normal to the plane of said seat so as to constitute in all of its positions a support for the foot terminals of the downwardly dangling legs of a seated child, interengageable foot rests supporting means carried thereby and by said side members, and one of said means having a series of portions which are selectively engageable by the other means and which are disposed in a plane substantially normal to the plane of said seat, an extensible lever supporting each end of said hand rail, means pivoting said levers to the adjacent side member, and side member carried lever portion-engaging stop means for retaining said hand rail in different pivoted adjustments with respect to said seat and foot rest.

2. The structure of claim 1, and a seat supported back rest for said seat and which is bodily shiftable relatively of the seat to different forward and rearward positions, cooperating interengageable means provided by said side members and back rest for supporting the latter in different substantially upright forward or rearward positions in respect to said seat, and the planewise relationship of the side member-provided means to the plane of the seat being angular.

3. The structure of claim 1, and a seat-supported back rest for said seat and which is bodily shiftable relatively of the seat to different forward and rearward positions, cooperating interengageable means provided by said side members and back rest for supporting the latter in different substantially upright forward or rearward positions in respect to said seat, the plane-wise relationship of the side member-provided means to the plane of the seat being angular, said cooperating foot rest-supporting means comprising upstanding hanger members pivotally connected to said foot rest adjacent each end of the latter, each of said hanger members having an engaging portion adjacent its upper end, and vertically spaced seats carried by said side frame members and selectively engageable by the engaging portions of said hangers.

4. The structure of claim 1 and said cooperating foot rest-supporting means comprising upstanding hanger members pivotally connected to said foot rest adjacent each end of the latter, each of said hanger members having an engaging portion adjacent its upper end, and vertically spaced seats carried by said frame members and selectively engageable by the engaging portions of said hangers.

5. In a rocking horse type of toy providing a frame comprising laterally spaced and parallel rockers, and upstanding side members fixedly secured thereto, there being a plurality of separate cross members connecting the side members and spaced in the direction of the length of said frame, a child's seat between said side members rearwardly of the forward ends of the latter and supported by certain of said cross members; the combination of a foot rest forwardly of said seat and bodily shiftable in a direction substantially normal to the plane of said seat so as to constitute in all of its positions a support for the foot terminals of the downwardly dangling legs of a seated child, interengageable foot rest supporting means carried thereby and by said side members, said foot rest-supporting means comprising upstanding hanger members pivotally connected to said foot rest adjacent each end of the latter, each of said hanger members having an engaging portion adjacent its upper end, and vertically spaced seats carried by each of said side frame members and selectively engageable by the seat-engaging portions of said hangers.

6. In a rocking horse type of toy providing a frame comprising laterally spaced and parallel rockers, and upstanding side members fixedly secured thereto, there being a plurality of separate cross members connecting the side members and spaced in the direction of the length of said frame, a child's seat between said side members rearwardly of the forward ends of the latter and supported by certain of said cross members; the combination of a foot rest forwardly of said seat and bodily shiftable in a direction substantially normal to the plane of said seat so as to constitute in all of its positions a support for the foot terminals of the downwardly dangling legs of a seated child, interengageable foot rest supporting means carried thereby and by said side members, one of said means having a series of portions which are selectively engageable by the other means and which are disposed in a plane substantially normal to the plane of said seat, said foot rest comprising a horizontally arranged panel, and a rocking action-actuated sound-emitting means carried by said frame between said side members and below the plane of said foot rest-providing panel so as to be out of reach of and concealed from a child occupying said seat.

7. In a rocking horse type of toy providing a frame comprising laterally spaced and parallel rockers, and upstanding side members fixedly secured thereto, there being a plurality of separate cross members connecting the side members and spaced in the direction of the length of said frame, a child's seat between said side members rearwardly of the forward ends of the latter and supported by certain of said cross members; the combination of a foot rest forwardly of said seat and bodily shiftable in a direction substantially normal to the plane of said seat so as to constitute in all of its positions a support for the foot terminals of the downwardly dangling legs of a seated child, interengageable foot rest supporting means carried thereby and by said side members, one of said means having a series of portions which are selectively engageable by the other means and which are disposed in a plane substantially normal to the plane of said seat, said foot rest comprising a horizontally arranged panel cooperating with said seat to conceal subjacent portions of said rockers from a seated child, and shiftable floor-engageable rocking action stop means and operating means therefor all located between and carried by said rockers and concealed from a seated child by said seat and foot rest.

8. In a rocking horse type of toy providing a frame comprising laterally spaced and parallel rockers, and upstanding side members fixedly secured thereto, there being a plurality of separate cross members connecting the side members and spaced in the direction of the length of said frame, a child's seat between said side members rearwardly of the forward ends of the latter and supported by certain of said cross members; the combination of a seat-supported back rest for said seat and which is bodily shiftable to different forward and rearward positions, cooperating interengageable means provided by said side members and back rest for sustaining the latter in different substantially upright forward and rearward positions in respect to said seat, the planewise relationship of the side member-provided means to the plane of the seat being angular, a foot rest forwardly of said seat and bodily shiftable in a direction substantially normal to the plane of said seat so as to constitute in all of its positions a support for the foot terminals of the downwardly dangling legs of a seated child, interengageable foot rest supporting means carried thereby and by said side members, said foot rest-supporting means comprising upstanding hanger members pivotally connected to said foot rest adjacent each end of the latter, each of said hanger members having a seat-engaging portion adjacent its upper end, and vertically spaced seats carried by each of said side frame members and selectively engageable by the engaging portions of said hangers.

References Cited in the file of this patent

UNITED STATES PATENTS

| | | |
|---|---|---|
| 267,678 | Crandall | Nov. 21, 1882 |
| 1,039,698 | Converse | Oct. 1, 1912 |
| 1,535,144 | Aptowicz | Apr. 28, 1925 |
| 2,225,723 | Spitzwieser | Dec. 24, 1940 |
| 2,236,381 | Rich | Mar. 25, 1941 |
| 2,494,045 | Kauffman | Jan. 10, 1950 |
| 2,552,002 | Dunbar | May 8, 1951 |
| 2,754,120 | Green | July 10, 1956 |
| 2,758,632 | Koller et al. | Aug. 14, 1956 |

FOREIGN PATENTS

| | | |
|---|---|---|
| 57,579 | Denmark | Apr. 22, 1940 |